US012812258B2

(12) United States Patent
Kitamura et al.

(10) Patent No.: US 12,812,258 B2
(45) Date of Patent: Nov. 24, 2026

(54) PROCESSING APPARATUS, IMAGING SYSTEM, PROCESSING METHOD, AND STORAGE MEDIUM THAT DETECT A CHANGE IN A SECOND IMAGE BY COMPARING A FIRST IMAGE WITH AN IMAGE OF A DISPLAY AREA IN THE SECOND IMAGE

(71) Applicant: CANON KABUSHIKI KAISHA, Tokyo (JP)

(72) Inventors: Kazuya Kitamura, Kanagawa (JP); Koki Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 18/986,996

(22) Filed: Dec. 19, 2024

(65) Prior Publication Data

US 2025/0220313 A1 Jul. 3, 2025

(30) Foreign Application Priority Data

Dec. 28, 2023 (JP) ................................ 2023-222807

(51) Int. Cl.
*H04N 23/81* (2023.01)
*H04N 23/69* (2023.01)

(52) U.S. Cl.
CPC ............ *H04N 23/81* (2023.01); *H04N 23/69* (2023.01)

(58) Field of Classification Search
CPC ........ H04N 23/81; H04N 23/69; H04N 5/222; H04N 25/704; H04N 5/272; H04N 17/002
See application file for complete search history.

(56) References Cited

U.S. PATENT DOCUMENTS

2019/0306384 A1* 10/2019 Hirotsune ................. G01J 1/42
2020/0005437 A1* 1/2020 Murase ..................... G06T 5/73
(Continued)

FOREIGN PATENT DOCUMENTS

CN 112330736 A 2/2021
JP H117518 A 1/1999
(Continued)

OTHER PUBLICATIONS

JP-2016005166-A Translation (Year: 2016).*
(Continued)

*Primary Examiner* — Jason A Flohre
(74) *Attorney, Agent, or Firm* — Venable LLP

(57) ABSTRACT

A processing apparatus causes a display apparatus to display a first image, and acquires from an image pickup apparatus a second image made by capturing at an angle of view including a display area of the display apparatus. A processor acquires a distinction result of distinguishing between an area in which an object existing between the display area and the image pickup apparatus has been captured, and the display area in the second image, detects a change in the second image by comparing the first image with an image of the display area in the second image, performs control for notifying information regarding a detection result, detects a first difference between the first image and the display area, and detects a second difference between the display area in a fourth image acquired by correcting the second image so that the first difference is less than a first predetermined value.

14 Claims, 9 Drawing Sheets

(56) References Cited

U.S. PATENT DOCUMENTS

| | | | | |
|---|---|---|---|---|
| 2023/0281758 | A1* | 9/2023 | Rotscholl | G06T 5/10 382/264 |
| 2024/0221139 | A1* | 7/2024 | Miyazawa | H04N 5/92 |
| 2024/0388787 | A1* | 11/2024 | Sugano | H04N 5/275 |
| 2024/0406338 | A1* | 12/2024 | Ishikawa | G11B 27/036 |

FOREIGN PATENT DOCUMENTS

| | | | | |
|---|---|---|---|---|
| JP | 2008-011334 | A | | 1/2008 |
| JP | 2016005166 | A | * | 1/2016 |
| WO | 2023047643 | A1 | | 3/2023 |
| WO | 2023055311 | A1 | | 4/2023 |
| WO | 2023238646 | A1 | | 12/2023 |

OTHER PUBLICATIONS

Extended European Search Report issued May 8, 2025, in corresponding European Patent Application No. 24223358.3 (11 pages).

* cited by examiner

NON-IMAGING-SURFACE PHASE-DIFFERENCE METHOD PIXEL STRUCTURE

| | | | | | | | | | |
|---|---|---|---|---|---|---|---|---|---|
| R | Gr | R | Gr | R | Gr | R | Gr | R | Gr |
| Gb | B | Gb | B | Gb | B | Gb | B | Gb | B |

FIG. 2A

IMAGING-SURFACE PHASE-DIFFERENCE METHOD PIXEL STRUCTURE

| | | | | | | | | | | | | | | | | | | | |
|---|---|---|---|---|---|---|---|---|---|---|---|---|---|---|---|---|---|---|---|
| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

FIG. 2B

PROCESSING APPARATUS, IMAGING SYSTEM, PROCESSING METHOD, AND STORAGE MEDIUM THAT DETECT A CHANGE IN A SECOND IMAGE BY COMPARING A FIRST IMAGE WITH AN IMAGE OF A DISPLAY AREA IN THE SECOND IMAGE

CROSS-REFERENCE TO PRIORITY APPLICATION

This application claims priority to Japanese Patent Application No. 2023-222807, which was filed on Dec. 28, 2023, and which is hereby incorporated by reference herein in its entirety.

BACKGROUND

Technical Field

The present disclosure relates to a processing apparatus, an imaging system, a processing method, and a storage medium.

Description of Related Art

Recently, virtual productions, in which a background image is displayed on an LED display (LED wall) and simultaneously imaged with a real object, have rapidly become popular. Any tiny moirés (interference fringes) on an LED display may not be noticed during imaging but may be noticed in post-production and cause reimaging, so moiré may be detected during imaging. Japanese Patent Laid-Open No. 2008-011334 discloses a method of converting a spatial axis signal representing an image containing moiré into a frequency axis signal, and then converting a frequency axis signal from which a frequency component corresponding to the moiré is removed, into a spatial axis signal.

The method disclosed in Japanese Patent Laid-Open No. 2008-011334 identifies moiré using a plurality of images captured at different imaging angles, and thus is to prepare a camera for moiré detection, which is separate from the camera for imaging.

SUMMARY

A processing apparatus according to one aspect of the disclosure is configured to cause a display apparatus to display a first image, and to acquire from an image pickup apparatus a second image made by capturing at an angle of view including a display area of the display apparatus. The processing apparatus includes a processor configured to acquire a distinction result of distinguishing between an area in which an object existing between the display area and the image pickup apparatus has been captured, and the display area in the second image, to detect a change in the second image by comparing the first image with an image of the display area in the second image, and to perform first control for notifying information regarding a detection result. Alternatively, the processing apparatus includes a processor configured to detect whether or not moiré has occurred in the display area of the second image, and to record on a recording medium an image in which the moiré has been corrected and information regarding an area where the moiré has been detected in a case when the moiré has been detected. An imaging system having the processing apparatus above also constitutes another aspect of the disclosure. A processing method corresponding to the above processing apparatus also constitutes another aspect of the disclosure. A storage medium storing a program that causes a computer to execute the processing method above also constitutes another aspect of the disclosure.

Further features of the disclosure will become apparent from the following description of embodiments with reference to the attached drawings.

BRIEF DESCRIPTION OF THE DRAWINGS

FIGS. 2A and 2B illustrate a part of a light receiving surface of an image sensor.

DETAILED DESCRIPTION

Figure 1:
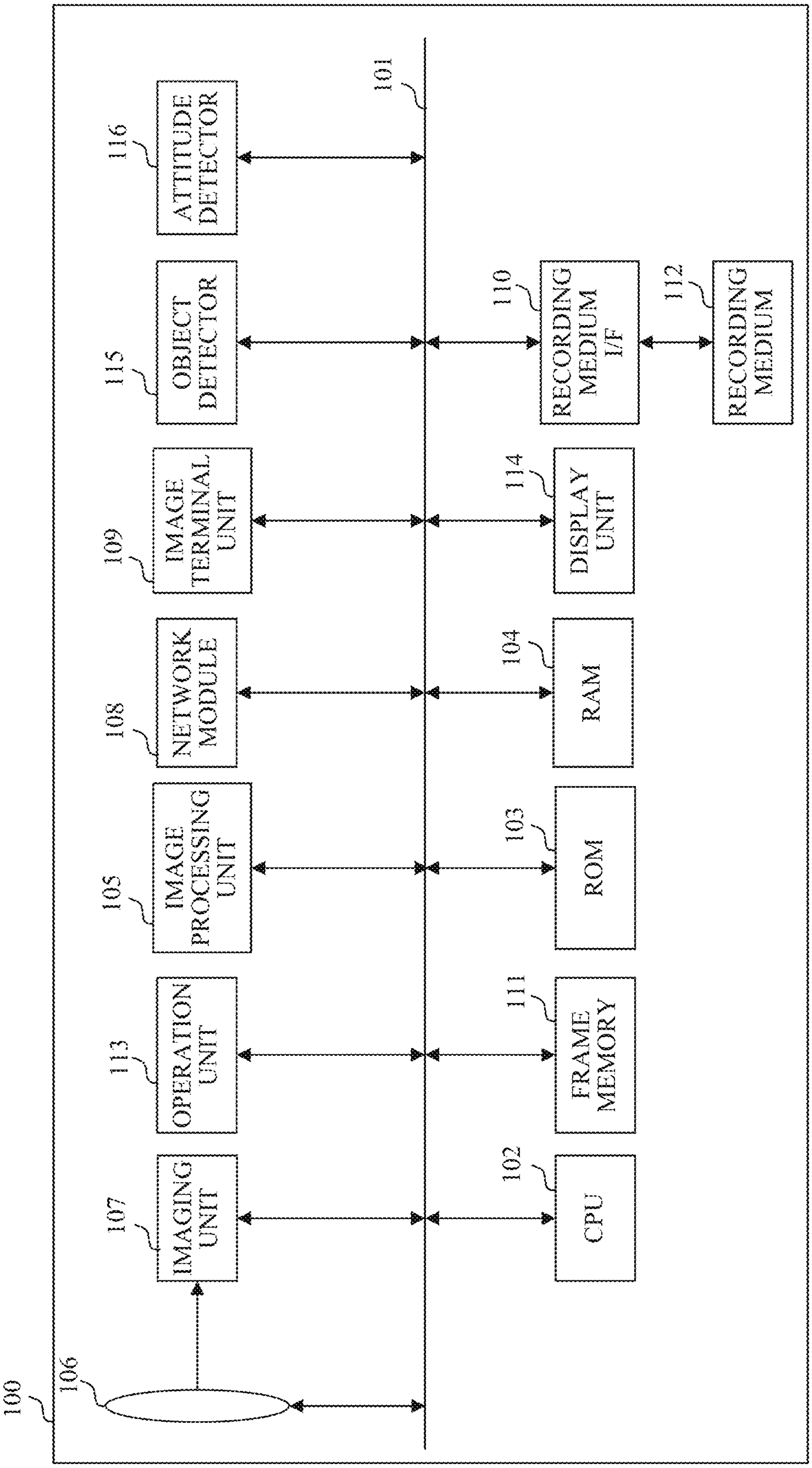
FIG. 1 is a block diagram of an image pickup apparatus.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a block diagram of an image pickup apparatus 100. The image pickup apparatus 100 can input, output, and record images. Each component connected to an internal bus 101 can communicate data with each other via the internal bus 101.

A lens unit 106 includes lens units including a zoom lens and a focus lens, an aperture mechanism, and a drive motor. An optical image passing through the lens unit 106 is received by an imaging unit 107. The imaging unit 107 uses a CCD or CMOS sensor, etc., and converts an optical signal into an electrical signal.

A CPU 102 controls each component in the image pickup apparatus 100 using a RAM 104 as a work memory according to a program stored in a ROM 103. The ROM 103 is a nonvolatile recording device, and records a program for operating the CPU 102, various adjustment parameters, etc. The RAM 104 is a volatile memory using a semiconductor device, is generally slower than a frame memory 111, and has a smaller capacity than that of a frame memory 111. The frame memory 111 is a device that temporarily stores an image signal and can read the signal out if necessary. Since image signals are a huge amount of data, the frame memory 111 is to have a high bandwidth and large capacity. Dual Data Rate 4-Synchronous Dynamic RAM (DDR4-SDRAM), and the like, have recently been used as the frame memory 111. Using the frame memory 111 can perform processing such as combining images that differ over time and cut out only a necessary area.

An image processing unit 105 performs various image processing for data from the imaging unit 107 or image data stored in the frame memory 111 or recording medium 112 under the control of the CPU 102. The image processing performed by the image processing unit 105 includes pixel interpolation, coding processing, compression processing, decoding processing, enlargement/reduction processing (resizing), noise reduction processing, color conversion processing, and the like, of image data. The image processing unit 105 performs processing such as correction of performance variations of pixels of the imaging unit 107, correction of defective pixels, white balance correction, luminance correction, and correction of distortion and peripheral light loss caused by lens characteristics. The image processing unit 105 performs processing of generating distance information regarding a distance from the image pickup apparatus 100 to the object to be imaged. The image processing unit 105 may be configured as a dedicated circuit block for performing specific image processing. Depending on the type of image processing, the CPU 102 may perform image processing according to a program without using the image processing unit 105.

The CPU 102 controls the lens unit 106 based on the calculation result acquired by the image processing unit 105, and performs optical image enlargement, focal length adjustment, and adjustment of an aperture stop configured to adjust a light amount. The CPU 102 may perform image stabilization by moving a part of the lens unit on a plane perpendicular to the optical axis.

An operation unit 113 is an interface with the external device that accepts user operations. The operation unit 113 can use mechanical elements such as buttons and switches, and includes a power switch, a mode switch, etc.

A display unit 114 serves as a display device that can be visually confirmed by the user. When the display unit 114 displays, for example, images processed by the image processing unit 105 and setting menus, the user can check the operation status of the image pickup apparatus 100. Small and low-power devices such as Liquid Crystal Displays (LCDs) and organic Electroluminescence (EL) have recently been used as the display unit 114. The display unit 114 may include a resistive or capacitive thin film device called a touch panel, and may be used as a substitute for the operation unit 113. The CPU 102 generates character strings for informing the user of the setting status of the image pickup apparatus 100 and a menu for setting the image pickup apparatus 100, and displays them on the display unit 114 by superimposing them on the image processed by the image processing unit 105. In addition to character information, the CPU 102 can further superimpose another imaging assist display such as a histogram, vector scope, waveform monitor, zebra, peaking, and false color.

An image (or video) terminal unit 109 includes a plurality of image terminals. Examples of the image terminals are Serial Digital Interface (SDI), High Definition Multimedia Interface (HDMI) (registered trademark), and DisplayPort (registered trademark). Outputting an image signal via the image terminal unit 109 can display an image in real time on an unillustrated external monitor. The CPU 102 can process an image input via the image terminal unit 109 in the image processing unit 105 and display the processed image on the display unit 114.

A network module 108 is an interface for inputting and outputting image and audio signals. The network module 108 can communicate with external devices via the Internet, etc., and can also send and receive files, commands, and various types of data such as image signals and metadata. The transmission method that is used by the network module 108 can be wireless or wired.

The recording medium 112 can record image data and various setting data, and use a large-capacity storage element. For example, a Hard Disc Drive (HDD) or Solid State Drive (SSD) is used as the recording medium 112, and is attached to a recording medium interface (I/F) 110. In a case when the user presses a predetermined button (hereinafter referred to as a record button) on the operation unit 113, the CPU 102 starts recording the image data processed by the image processing unit 105 into the recording medium 112 via the recording medium I/F 110. In a case when the user presses the record button again, the recording is stopped. During recording, a signal indicating that the image pickup apparatus 100 is recording, is output via the network module 108 and the image terminal unit 109. This configuration can notify an external device that recording is in progress, or record image data output from the image pickup apparatus 100 in the external device in conjunction with a recording operation on the image pickup apparatus 100.

An object detector 115 detects objects using artificial intelligence, such as deep learning using a neural network. In the case of object detection using deep learning, the CPU 102 transmits a program for processing, a network structure, weight parameters, and the like, stored in the ROM 103 to the object detector 115. The object detector 115 performs processing to detect an object from the image signal based on various parameters acquired from the CPU 102, and loads the processing result in the RAM 104.

An attitude (or orientation) detector 116 detects the attitude state of the image pickup apparatus 100 using, for example, a gyro sensor or an acceleration sensor. This configuration can detect whether the camera is tilted or shaking.

FIGS. 2A and 2B illustrate a part of a light receiving surface of the image sensor of the imaging unit 107. In the imaging unit 107, in order to enable imaging-surface phase-difference autofocus (AF), pixel units each having two photodiodes as light receiving units as photoelectric converters for a single microlens are arranged in an array. This configuration enables each pixel unit to receive a light beam that has been divided by the exit pupil of the lens unit 106.

FIG. 2A is a schematic diagram of a part of the image sensor surface in an example Bayer array of red (R), blue (B), and green (Gb, Gr). FIG. 2B illustrates an example pixel unit each having two photodiodes for a single microlens, corresponding to the color filter array in FIG. 2A.

The image sensor according to this embodiment can output two signals for phase-difference detection (also referred to as A-image signal and B-image signal hereafter) from each pixel unit. The sensor can also output an imaging signal (A-image signal+B-image signal) acquired by adding the signals of two photodiodes. In a case when the added signal is output, a signal equivalent to the output of the image sensor of the example Bayer array illustrated in FIG. 2A is output.

The imaging unit 107 can output a phase-difference detection signal for each pixel unit, but can also output a value acquired by adding and averaging the phase-difference detection signals of a plurality of adjacent pixel units. Outputting the added and averaged value can reduce the time to read signals from the imaging unit 107 and the bandwidth that is used by the internal bus 101. Using such output signals from the imaging unit 107, the CPU 102 performs a correlation calculation of the two image signals and calculates information such as a defocus amount, parallax information, and various types of reliability.

A defocus amount on the image plane is calculated based on a shift between the A-image signal and the B-image signal. The defocus amount has a positive or a negative value, and whether the defocus amount is a positive or a negative value determines whether the state is a front focus state or a rear focus state. The absolute value of the defocus amount provides information regarding the in-focus degree (degree of focus shift), and a defocus amount of zero represents an in-focus state. That is, the CPU 102 calculates information on whether the image is in front or rear focus based on the positive or negative sign of the defocus amount. The CPU 102 also calculates in-focus degree information based on the absolute value of the defocus amount. The information on whether the image is in front or rear focus is output in a case when the defocus amount exceeds a predetermined value, and, in a case when the absolute value of the defocus amount is within a predetermined value, information indicating that the image is in focus is output.

The CPU 102 controls the lens unit 106 according to a defocus amount for focusing. The CPU 102 also calculates a distance to an object using the principle of triangulation from parallax information and the lens information regarding the lens unit 106.

Although FIGS. 2A and 2B illustrate an example in which pixel units each having two photodiodes are arranged in an array for a single microlens, the present disclosure is not limited to this example. Pixel units each having three or more photodiodes may be arranged in an array for a single microlens. A plurality of pixel units may be provided in which the opening position of the light receiving unit is different for the microlens. In other words, as long as two signals capable of detecting a phase difference, such as an A-image signal and a B-image signal, can be acquired, a configuration other than that illustrated in FIGS. 2A and 2B may be used.

Figure 3:
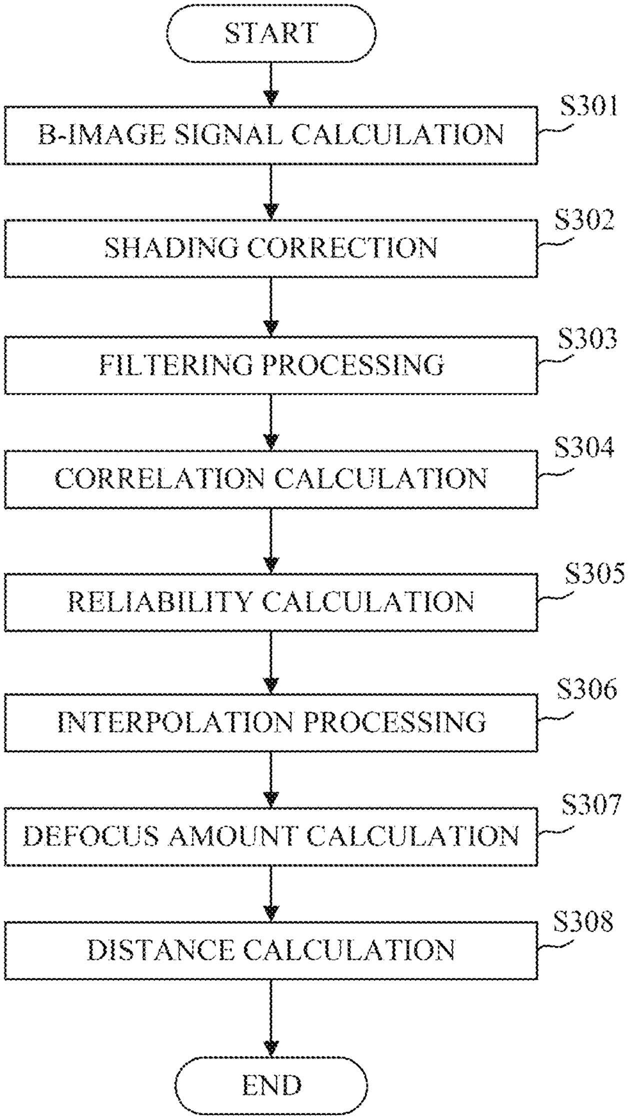
FIG. 3 is a flowchart illustrating distance information generating processing.

A description will now be given of the distance information generating processing performed by the image processing unit 105. FIG. 3 is a flowchart illustrating the distance information generation processing.

In step S301, the image processing unit 105 calculates a B-image signal for phase-difference detection by calculating a difference between two signals, the (A-image signal+B-image signal) for imaging output from the imaging unit 107 and the A-image signal for phase-difference detection. This embodiment uses a method in which the (A-image signal+B-image signal) for imaging and the A-image signal for phase-difference detection are output, but the present disclosure is not limited to this example. The A-image signal and the B-image signal may be output in this state from the imaging unit 107. In this case, the (A-image signal+B-image signal) for imaging can be calculated by adding the A-image signal and the B-image signal. In a case when two sensors are provided, such as a stereoscopic camera, the image signals output from the respective image sensors may be the A-image signal and the B-image signal.

In step S302, the image processing unit 105 corrects shading caused by optical factors for each of the A-image signal for phase-difference detection and the B-image signal for phase-difference detection.

In step S303, the image processing unit 105 performs filtering processing for each of the A-image signal for phase-difference detection and the B-image signal for phase-difference detection. The filtering processing may be performed, for example, by a high-pass filter including a Finite Impulse Response (FIR) filter. In this embodiment, the A-image signal for phase-difference detection and the B-image signal for phase-difference detection are passed through the high-pass filter, but the present disclosure is not limited to this example. Signals may be generated through a band-pass filter or a low-pass filter with different filter coefficients. Then, correlation calculation processing, which will be described later, may be performed using the A-image signal for the generated phase-difference detection and the B-image signal for the generated phase-difference detection.

In step S304, the image processing unit 105 performs correlation calculation using divided fine blocks for the A-image signal for phase-difference detection and the B-image signal for phase-difference detection, for which the filtering processing has been performed in step S303. The size or shape of the fine blocks is not limited, and adjacent blocks may overlap each other.

A description will now be given of the correlation calculation of a pair of images, the A-image and the B-image. A signal sequence of the A-image at the target pixel position is denoted as E(1) to E(m), and a signal sequence of the B-image at the target pixel position is denoted as F(1) to F(m). While the signal sequence F(1) to F(m) of the B-image is shifted from the signal sequence E(1) to E(m) of the A-image, a correlation amount C(k) at a shift amount k between the two signal sequences is calculated using the following equation (1).

$$C(k)=\sum|E(n)-F(n+k)| \tag{1}$$

Figure 4:
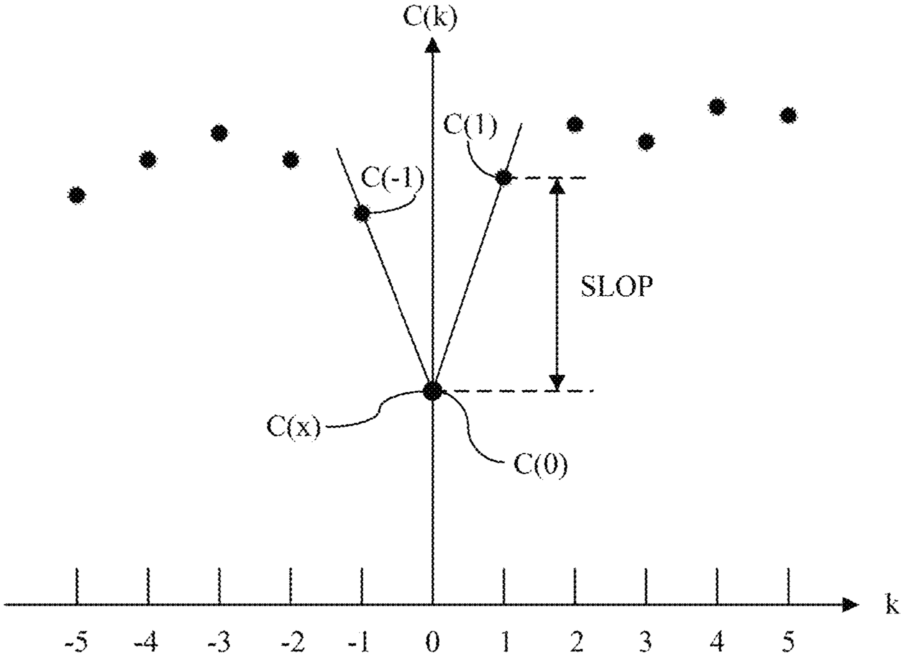
FIG. 4 illustrates a correlation calculation result in a case where a pair of image signal sequences is highly correlated in an ideal state having no noise.

In equation (1), the Σ operation means an operation to calculate the sum for n. In the Σ operation, a range of n and n+k is limited to a range from 1 to m. A shift amount k is an integer value, and is a relative pixel shift amount in units of the detection pitch of a pair of data. Hereinafter, k where a discrete correlation amount C(k) is minimum is represented as kj. In an ideal state having no noise, FIG. 4 illustrates a calculation result of equation (1) in a case when the correlation between a pair of image signal strings is high. As illustrated in FIG. 4, the correlation amount C(k) is minimum at a shift amount (k=kj=0) when the correlation between a pair of image signal strings is high. The point interpolation processing illustrated in equations (2) to (4) calculates x that gives a minimum value C(x) for a continuous correlation amount. A pixel shift amount x is a real value, and the unit is pixel.

$$x = kj + \frac{D}{\text{SLOP}} \tag{2}$$

$$D = \frac{\{C(kj-1) - C(kj+1)\}}{2} \tag{3}$$

$$\text{SLOP} = \text{MAX}\{C(kj+1) - C(kj), C(kj-1) - C(kj)\} \tag{4}$$

SLOP in equation (4) represents a minimum and local minimum correlation amount and a slope of a change in the adjacent correlation amount. In FIG. 4, as a concrete example, C(kj)=C(0)=1000, C(kj−1)=C(−1)=1700, C(kj+1)=C(1)=1830. kj=0. From equations (2) to (4), SLOP=830, x=−0.078 [pixel]. In the in-focus state, an ideal pixel shift amount x for the signal sequence of the A-image and the signal sequence of the B-image is 0.00.

Figure 5:
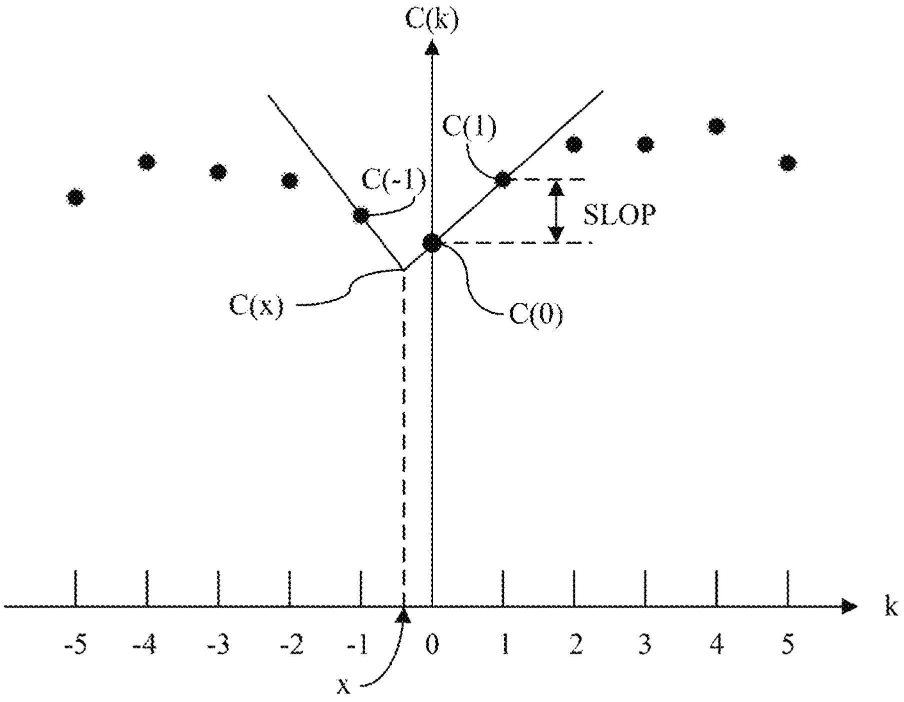
FIG. 5 illustrates a correlation calculation result in a fine block having noise.

FIG. 5 illustrates the calculation result in a case when equation (1) is applied to a small block containing noise. As illustrated in FIG. 5, the correlation between the signal sequence of the A-image and the signal sequence of the B-image decreases due to the influence of randomly distributed noise. The minimum value of the correlation amount C(k) is greater than the minimum value in FIG. 4, and the correlation amount curve has an overall flat shape (or an absolute difference between the maximum and minimum values is small).

In FIG. 5, as a concrete examples, C(kj)=C(0)=1300, C(kj−1)=C(−1)=1480, and C(kj+1)=C(1)=1800. kj=0. From equations (2) to (4), SLOP=500, x=−0.32 [pixel]. In comparison with the calculation result in a state having no noise as illustrated in FIG. 4, the pixel shift amount x is farther from the ideal value.

In a case when the correlation between the pair of image signal strings is low, a change amount of the correlation amount C(k) is small and a correlation amount curve is generally flat, so a SLOP value is small. Similarly, in a case when an object image has a low contrast, the correlation between the pair of image signal strings is low and a correlation amount curve has a flat shape. Based on this property, the reliability of the calculated pixel shift amount x can be determined by the SLOP value. That is, in a case when the SLOP value is great, it can be determined that the correlation between the pair of image signal strings is high, and, in a case when the SLOP value is small, it can be determined that no significant correlation has been acquired between the pair of image signal strings. This embodiment uses equation (1) for the correlation calculation, and thus the correlation amount C(k) is smallest and locally minimum at the shift amount where the correlation between the pair of image signal strings is highest. As another method, a correlation calculation method may be used where the correlation amount C(k) is largest and locally maximum at the shift amount where the correlation between the pair of image signal strings is highest.

In step S305, the image processing unit 105 calculates the reliability. The reliability can be defined by C(kj), which indicates the degree of coincidence between the two images calculated in step S304, as described above, and a value of SLOP.

In step S306, the image processing unit 105 performs interpolation processing. The pixel shift amount calculated in step S304 may not be able to be used because the reliability calculated in step S305 is low. In such cases, there is no need to perform interpolation using the pixel shift amount calculated around it. The interpolation method may apply a median filter or reduce pixel shift amount data and then enlarge the data again. Color data may be extracted from the (A-image signal+B-image signal) for imaging, and a pixel shift amount may be interpolated using the color data.

In step S307, the image processing unit 105 calculates a defocus amount by referring to a pixel shift amount x calculated in step S304. More specifically, a defocus amount (denoted as DEF) can be acquired by the following equation (5):

$$DEF = P \times x \tag{5}$$

In equation (5), P is a conversion coefficient determined by the detection pitch (pixel arrangement pitch) and a distance between projection centers of two left and right viewpoints in a pair of parallax images, and is expressed in mm/pixel.

In step S308, the image processing unit 105 calculates a distance from the defocus amount calculated in step S307. Where Da is a distance to an object, Db is a focus position, and F is a focal length, the following equation (6) approximately holds:

$$\frac{1}{Db} - \frac{1}{Da} = \frac{1}{F} \tag{6}$$

Therefore, the distance Da to the object is expressed by the following equation (7):

$$Da = \frac{Db \cdot F}{F - Db} \tag{7}$$

In a case when Db is Db0 where DEF=0, the absolute distance Da' to the object is expressed by the following equation (8):

$$Da' = \frac{(Db0 - DEF) \cdot F}{F - (Db0 - DEF)} \tag{8}$$

The relative distance Da-Da' is expressed by the following equation (9) from equations (7) and (8):

$$Da - Da' = \frac{DEF \cdot F^2}{(F - Db0)^2 + DEF \cdot (F - Db0)} \tag{9}$$

As described above, performing processing according to the flow in FIG. 3 can calculate a pixel shift amount, a defocus amount, and distance information based on the A-image signal for phase-difference detection and the B-image signal for phase-difference detection.

Figure 6:
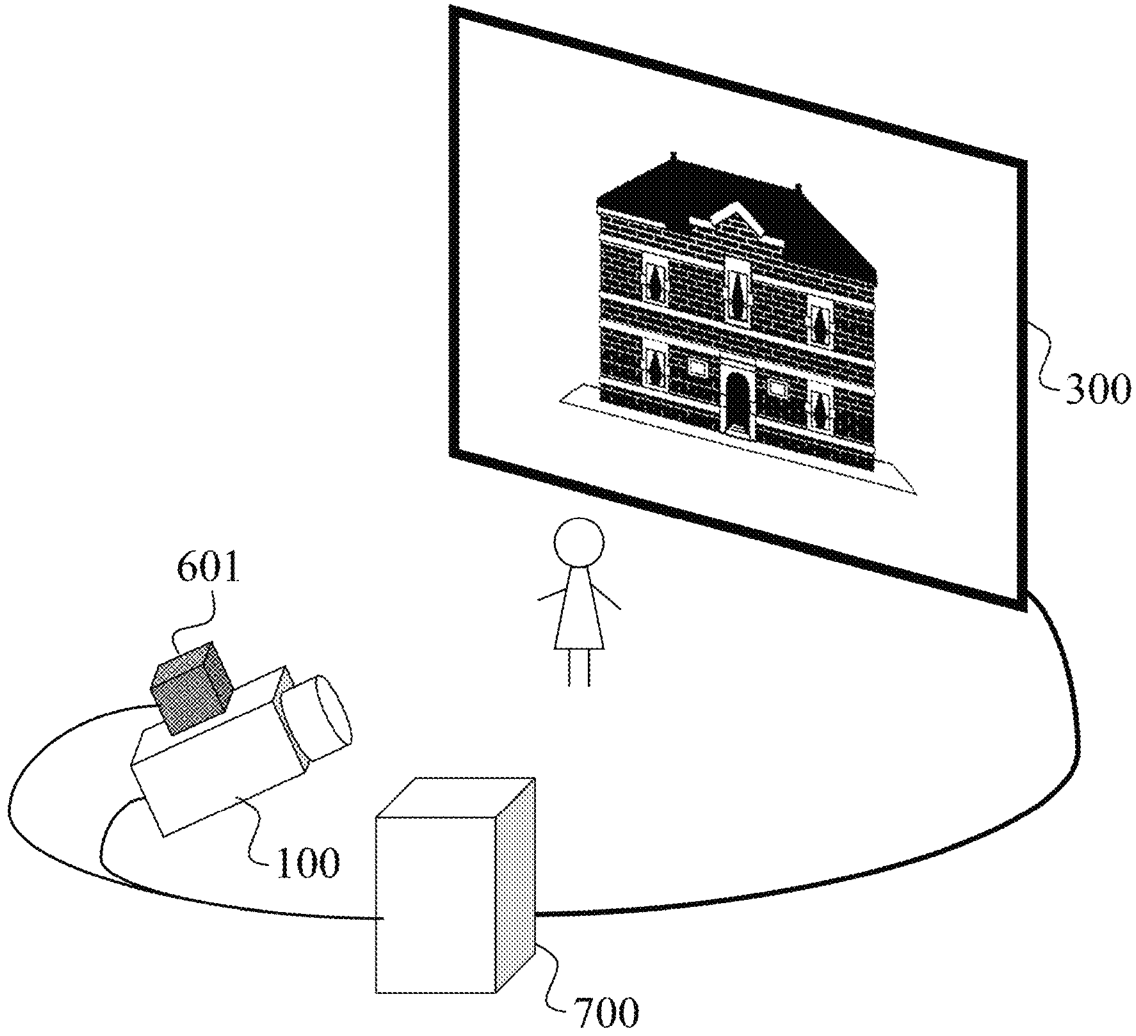
FIG. 6 illustrates an imaging system according to a first embodiment.

FIG. 6 illustrates the imaging system according to this embodiment. The imaging system includes the image pickup apparatus 100, an image signal processing apparatus 700, and a display apparatus 300. The image pickup apparatus 100, the image signal processing apparatus 700, and the display apparatus 300 are connected by wire or wirelessly. The display apparatus 300 displays an image signal (first image or video) input via an unillustrated image input terminal. A coordinate detection apparatus 601 is attached to the image pickup apparatus 100, detects the position and attitude of the image pickup apparatus 100 by referring to markings on the ceiling, floor, etc., and, by emitting infrared rays, or the like, and detecting reflected light, and transmits the detected information to the image signal processing apparatus 700. The image pickup apparatus 100 captures an image (second image or video) including a display area displaying the first image of the display apparatus 300.

Figure 7:
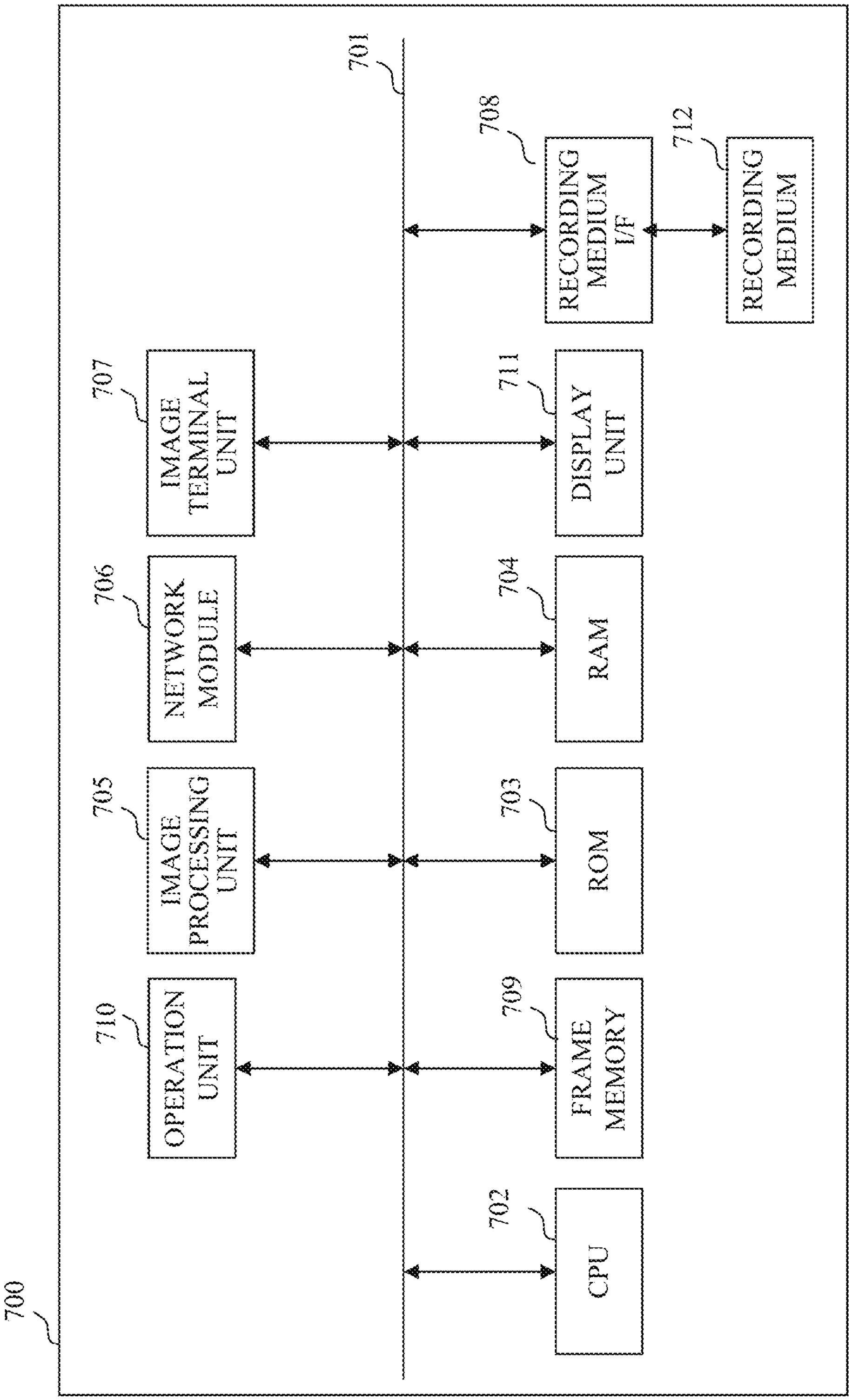
FIG. 7 is a block diagram of an image signal processing apparatus.

FIG. 7 is a block diagram of the image signal processing apparatus 700. The image signal processing apparatus 700 can input, output, and record images. Each component connected to an internal bus 701 can communicate data with each other via the internal bus 701.

A CPU 702 controls each component of the image signal processing apparatus 700 according to a program stored in a ROM 703, using a RAM 704 as a work memory. The ROM 703 is a nonvolatile storage device that stores a program for operating the CPU 702 and various adjustment parameters. The RAM 704 is a volatile memory that uses a semiconductor device, and is generally slower and has a smaller capacity than a frame memory 709. The frame memory 709 is a device that temporarily stores an image signal and can read it out if necessary. Since image signals are a huge amount of data, the frame memory 709 is to have a high bandwidth and large capacity. Recently, DDR4-SDRAM, and the like, are used as the frame memory 709. Using the frame memory 709 can perform processing such as combining images that differ over time and cut out only a required area.

An image processing unit 705 performs various image processing for image data stored in the frame memory 709 or the recording medium 712 under control of the CPU 702. The image processing unit 705 may include a dedicated circuit block for performing specific image processing. Depending on the type of image processing, the CPU 702 can perform image processing according to a program without using the image processing unit 705.

The operation unit 710 is an interface with the external device that accepts user operations. The operation unit 710 includes a mouse, a keyboard, a touch panel, or the like.

A display unit 711 serves as a display device that can be visually confirmed by the user. When the display unit 711 displays, for example, images processed by the image processing unit 705, setting menus, and the like, the user can check the operation status of the image signal processing apparatus 700. Small and low-power devices such as LCDs and organic ELs have recently been used as the display unit 711. The display unit 711 may also include a resistive film type or capacitive film element called a touch panel, and may be used as a substitute for the operation unit 710. The CPU 702 generates character strings for informing the user of the setting status of the image signal processing apparatus 700 and a menu for setting the image signal processing apparatus 700, and displays them on the display unit 711 by superimposing them on the image processed by the image processing unit 705.

An image terminal unit 707 includes a plurality of image terminals. Examples of the image terminal include SDI, HDMI, and DisplayPort. Outputting an image signal via the image terminal unit 707 can display an image in real time on an unillustrated external monitor. The CPU 702 can process an image input via the image terminal unit 707 in the image processing unit 705 and display the processed image on the display unit 711.

A network module 706 is an interface for inputting and outputting image signals and audio signals. The network module 706 can communicate with external devices via the Internet, etc., and can also send and receive files, commands, and various types of data such as image signals and metadata. The transmission method that is used by the network module 706 may be wireless or wired.

The recording medium 712 can record image data and various setting data, and use a large-capacity storage element. For example, an HDD or an SSD is used as the recording medium 712, and is attached to the recording medium I/F 708. In a case when the user presses a predetermined button (referred to as a record button hereinafter) on the operation unit 710, the CPU 702 starts recording the image data processed by the image processing unit 705 or the image data input from the image terminal unit 707 into the recording medium 712 via the recording medium I/F 708. In a case when the user presses the record button again, the recording is stopped. The CPU 702 can also record image data into the recording medium 712 according to a signal indicating that recording is in progress, which is received via the network module 706 or the image terminal unit 707.

The image signal processing apparatus 700 also acquires lens information such as a focal length of the image pickup apparatus 100, information such as exposure, etc., via the network module 706 and the image terminal unit 707. The CPU 702 reads out three-dimensional model data recorded on the recording medium I/F 708. Next, the CPU 702 re-renders the three-dimensional model data in the image processing unit 705 based on the lens information, exposure, etc. of the image pickup apparatus 100, and the position and attitude information regarding the image pickup apparatus 100 acquired from the coordinate detection apparatus 601. Then, the CPU 702 generates a CG image suitable for the angle of view of the image pickup apparatus 100, and outputs the image to the display apparatus 300 as a background image.

Figure 8:
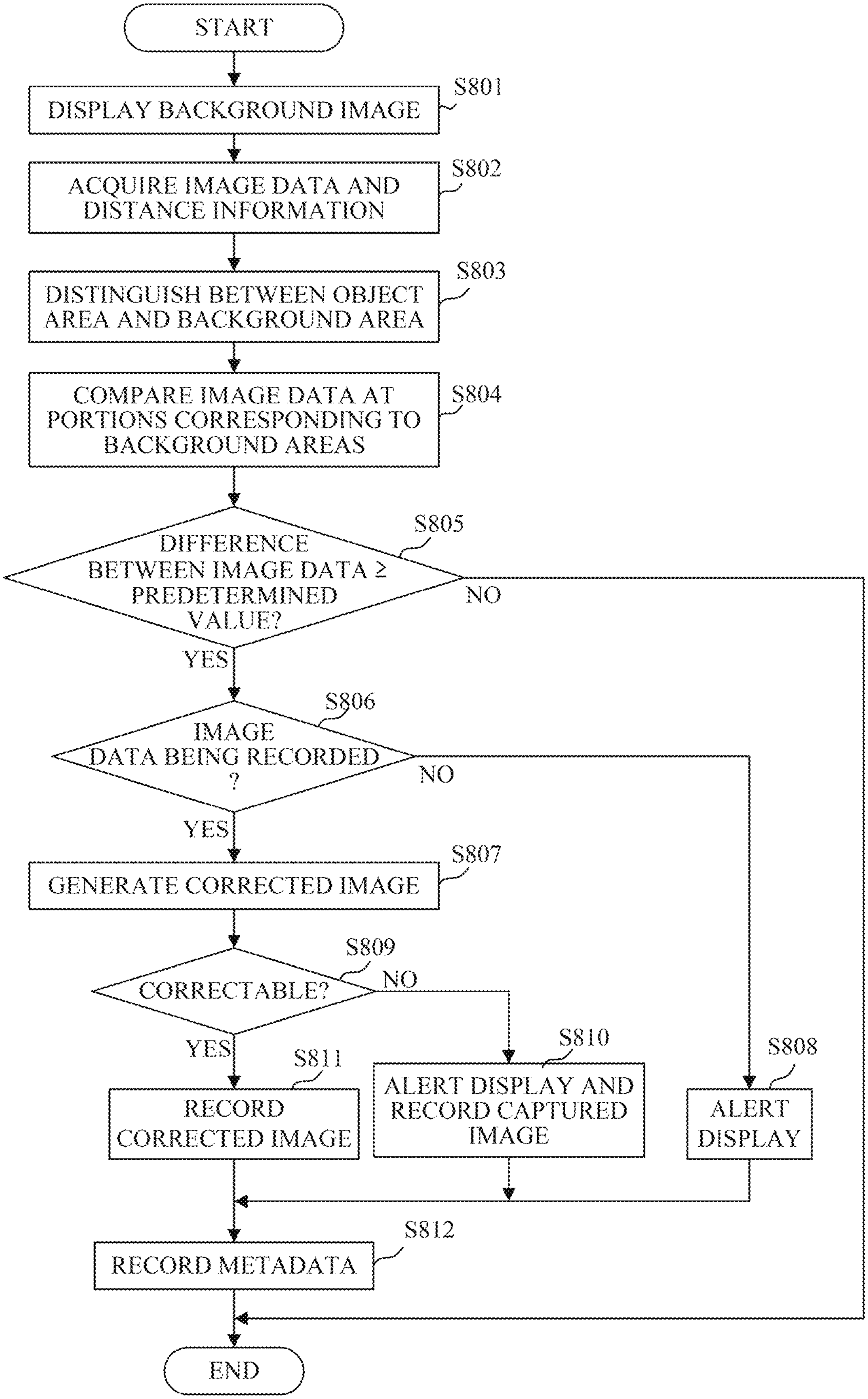
FIG. 8 is a flowchart illustrating abnormality detection and removal processing in a background image of the imaging system according to the first embodiment.

Referring now to FIG. 8, a description will be given of abnormality detection and removal processing for a background image according to this embodiment. FIG. 8 is a flowchart illustrating the abnormality detection and removal processing for the background image of the imaging system according to this embodiment.

In step S801, the CPU 702 first reads out three-dimensional model data recorded in the recording medium I/F 708. Next, the CPU 702 re-renders the three-dimensional model data in the image processing unit 705 based on the lens information, information regarding exposure, etc., of the image pickup apparatus 100, and position and attitude information regarding the image pickup apparatus 100 acquired from the coordinate detection apparatus 601. Then, the CPU 702 generates a CG image that matches the angle of view of the image pickup apparatus 100, and outputs the image to the display apparatus 300 as a background image (first image). The background image is displayed on the display apparatus 300.

In step S802, the CPU 102 acquires image data (second image) including an object and background image captured by the imaging unit 107 and processed by the image processing unit 105, and distance information, and stores them in the frame memory 111.

Figure 9:
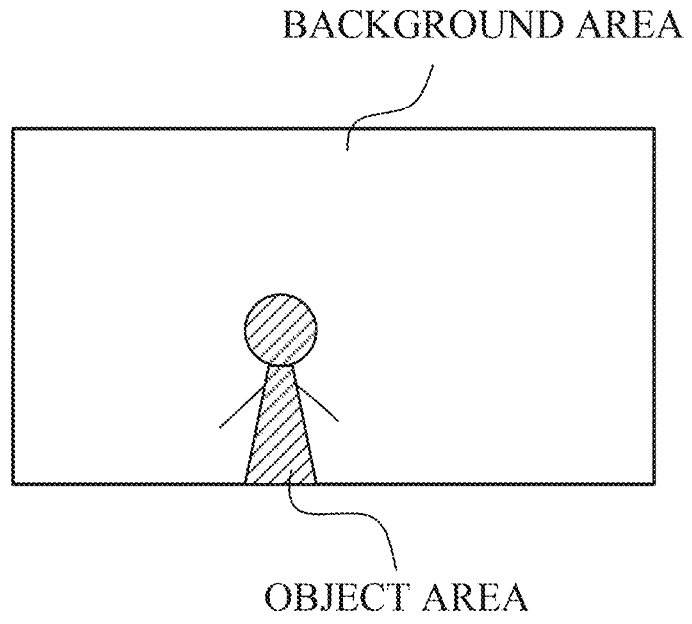
FIG. 9 illustrates an object area and a background area in image data.

In step S803, the CPU 102 first reads out the image data and distance information from the frame memory 111. Next, the CPU 102 determines an object area including the object in the image data and a background area (display area) including the background image, as illustrated in FIG. 9, according to the distance information. Next, the CPU 102 adds flags indicating the object area and the background area to the image data, and stores the image data in the frame memory 111. The method of distinguishing between the object area and the background area is providing a threshold to the distance information, determining that the area is the background area in a case when the distance is equal to or greater than the threshold, and determining that the area is the object area in a case when the distance is less than the threshold. The threshold value may be set manually by the user, or may be set automatically based on the aperture value (F-number), focus position, etc., of the lens unit 106. Then, the CPU 102 outputs flags indicating the object area and background area, and image data, to the image signal processing apparatus 700 via the image terminal unit 109 and the network module 108.

In this embodiment, the CPU 102 distinguishes between the object area and the background area, but the CPU 702 may acquire image data and distance information from the image pickup apparatus 100 and distinguish between the object area and the background area.

In step S804, the CPU 702 acquires the flags indicating the object area and background area, and image data output by the image pickup apparatus 100 via the image terminal unit 707 and the network module 706. That is, the CPU 702 functions as an acquiring unit for acquiring flags indicating the object area and background area, as a result of distinguishing between the object area and the background area. In a case when the resolution or imaging angle of the background image output in step S801 differs from that of the image data output by the image pickup apparatus in step S803, the CPU 702 performs resizing processing or angle correction processing for the background image to match the resolution and imaging angle. Then, the CPU 702 compares the image data of the portions corresponding to the background areas. In this embodiment, the CPU 702 functions as a detector configured to compare the image data of the portions corresponding to the background areas of the images and detects a difference (first difference).

In step S805, the CPU 702 determines whether the difference (first difference) between pixels in the areas compared in step S804 is equal to or greater than a predetermined value (first predetermined value or greater). In this embodiment, the CPU 702 determines whether there is a pixel whose difference is equal to or greater than a predetermined value. In a case when the CPU 702 determines that the difference between pixels is equal to or greater than the predetermined value, the CPU 702 executes the processing of step S806. In a case when the CPU 702 determines that the difference between pixels is not equal to or greater than the predetermined value, the CPU 702 ends this flow. This embodiment makes the determination based on whether there is a pixel in which the difference between pixels in the compared areas is equal to or greater than the predetermined value, but the present disclosure is not limited to this example. For example, the processing of step S806 may be executed in a case when an average value of the differences between pixels is equal to or greater than a predetermined value, or in a case when the number of pixels in which the difference between pixels is equal to or greater than a predetermined value is equal to or greater than a predetermined number of pixels.

In step S806, the CPU 702 determines whether the image data is being recorded. In a case when the CPU 702 determines that the image data is being recorded, the CPU 702 executes the processing of step S807, and, in a case when the CPU 702 determines that the image data is not being recorded, executes the processing of step S808.

In step S807, the image processing unit 705 generates a corrected image of the image data input from the image pickup apparatus 100 under the control of the CPU 702. More specifically, the CPU 702 first performs Fast Fourier Transform (FFT) for the background image output in step S801 and for the portion of the image data output by the image pickup apparatus in step S803 that corresponds to the background area. Thereby, a spatial axis signal can be converted into a frequency axis signal. Then, the respective frequency components are compared, and a signal of the frequency component present only in the image data input from the image pickup apparatus 100 is determined to be moiré, and signal processing is performed to remove that frequency component (so that the frequency component is less than a first predetermined amount). One method of removing a specific frequency component can use, for example, filtering processing using a notch filter. Then, by performing an inverse FFT for the frequency axis signal from which the frequency component of the moiré has been removed and converting the signal into a spatial axis signal, image data from which the moiré has been removed can be acquired.

In step S808, the CPU 702 generates an alert (or warning) display notifying the user that moiré, or the like, has occurred and an unintended background image has been captured, and outputs the alert to the image pickup apparatus 100 and the display apparatus 300 via the image terminal unit 707. Then, an alert is displayed on the display unit 114 of the image pickup apparatus 100, the display apparatus 300, and the display unit 711 of the image signal processing apparatus 700, and is conveyed to the user. The alert display input to the image pickup apparatus 100 may be output from the image terminal unit 109, and the alert may be displayed on an unillustrated external monitor. In this embodiment, the CPU 702 functions as a control unit configured to perform control to notify the user that the difference in image data in the portions corresponding to the background areas is large, moiré has occurred, and an unintended background image has been captured.

Thus, the CPU 702 displays an alert on the display unit in this embodiment, but the present disclosure is not limited to this embodiment as long as it is possible to notify the user that moiré has occurred and an unintended background image has been captured. For example, control to notify the user by vibration or sound may be performed.

In step S809, in a case when the resolution or imaging angle of the background image output in step S801 differs from that of the corrected image generated in step S807, the CPU 702 performs resizing processing and angle correction processing for the background image to match the resolution and imaging angle. Then, the CPU 702 compares the image data of the portions corresponding to the background areas. The CPU 702 determines whether a correction is possible according to a difference between pixels in the compared areas. In a case when the CPU 702 determines that the difference between pixels in the compared areas is equal to or greater than a predetermined value (a second predetermined value or greater), that is, in a case when correction is impossible, the CPU 702 executes the processing of step S810. In a case when the CPU 702 determines that the difference between pixels in the compared areas is less than a predetermined value (less than a second predetermined value), that is, in a case when it determines that correction is possible, the CPU 702 executes the processing of step S811. This embodiment determines whether the difference between pixels in the compared areas is equal to or greater than a predetermined value, but the present disclosure is not limited to this embodiment. For example, the processing of step S810 may be performed in a case when an average value of the differences between pixels is equal to or greater than a predetermined value, or in a case when the number of pixels whose differences between pixels are equal to or greater than a predetermined value is equal to or greater than a predetermined number.

In step S810, the CPU 702 generates an alert display notifying the user that moiré, or the like, has occurred and an unintended background image has been captured, and outputs the alert to the image pickup apparatus 100 via the image terminal unit 707. Then, an alert is displayed on the display unit 114 of the image pickup apparatus 100 and the display unit 711 of the image signal processing apparatus 700, and the user is informed not to affect the recorded image, and the image data input from the image pickup apparatus 100 is recorded in the recording medium I/F 708. The alert display input to the image pickup apparatus 100 may be output from the image terminal unit 109, and the alert may be displayed on an unillustrated external monitor.

In step S811, the CPU 702 performs processing to record the corrected image generated by the image processing unit 705 in step S807 in the recording medium I/F 708, and to output it via the image terminal unit 707.

In step S812, the CPU 702 performs processing to record data indicating the area corrected in step S807 and a time code indicating the time or frame when the correction was made as metadata in the recording medium I/F 708, and to output it via the image terminal unit 707.

This embodiment determines in step S809 whether a correction is possible, and the corrected image is recorded and output in step S811, but the present disclosure is not limited to this embodiment. It is also possible to perform the processing of step S810 without determining whether correction is possible in step S809, and to correct the background area in a post-processing step after imaging using the recorded captured image, the metadata recorded in step S812, and the background image output in step S801. At this time, the CPU 702 associates the corrected captured image with metadata indicating that moiré has been corrected and records them in the recording medium 712. In addition, the CPU 702 may output and record metadata indicating that moiré has occurred in the display area of the display apparatus 300 together with the captured image into the recording medium 712, without performing correction to remove moiré in step S807, in order to perform correction later.

In this embodiment, a method of removing moiré converts image data into a frequency axis signal, and identifies and removes the frequency components of moiré, but the present disclosure is not limited to this embodiment. For example, moiré may be removed by generating image data by converting the background image output in step S801 according to the angle of view of the image pickup apparatus 100, to match the resolution and imaging angle of the image data output by the image pickup apparatus 100, and by replacing the background area of the image data input from the image pickup apparatus 100.

This embodiment uses distance information calculated using the A-image signal and B-image signal acquired from the imaging unit 107 as a way for separating the object area from the background area, but the present disclosure is not limited to this embodiment. The distance to the object may be acquired by using another measure such as a distance sensor, or the object area and the background area may be separated using an image segmentation technology without using the distance information.

Performing the above processing can detect and remove moiré that occurs during imaging while a background image is displayed on the display unit. In a case when there is a difference of a predetermined value or more between the background image output by the image signal processing apparatus 700 to the display apparatus 300 and the background image displayed on the display apparatus 300 and captured by the image pickup apparatus 100, not only moiré, but also, changes in luminance, color, distortion, pixel/area defects, etc. can be detected and removed. The method of detecting such changes is not limited to the above method of calculating the difference, and any calculation method can be used as long as the method can compare the background image output to the display apparatus 300 and the background image captured by the image pickup apparatus 100 for each area and pixel, such as a ratio.

Moiré may be estimated from optical design information regarding the image pickup apparatus 100 (such as the pixel pitch of the image sensor, focus, zoom, and object distance) and the pixel pitch information regarding the display apparatus 300, in addition to the moiré detecting method in this embodiment.

Second Embodiment

In the first embodiment, moiré is removed by generating a corrected image of image data input from the image pickup apparatus 100.

Moiré may occur during imaging due to interference with a repetitive pattern contained in the image displayed as the background image. In such a case, moiré can be suppressed by correcting the background image to be displayed. Accordingly, this embodiment removes moiré by correcting and outputting the background image output by the image signal processing apparatus 700.

Figure 10:
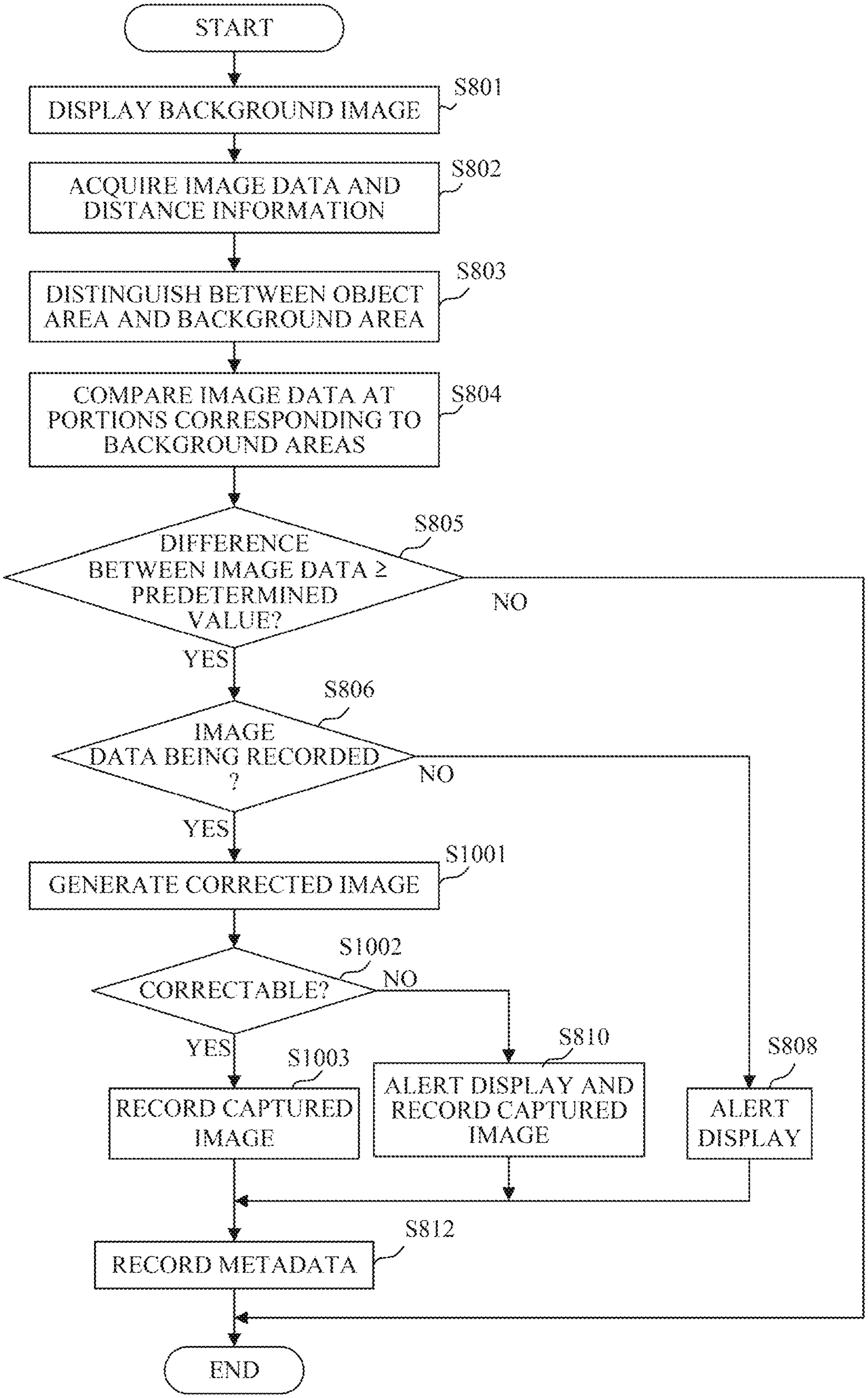
FIG. 10 is a flowchart illustrating abnormality detection and removal processing in a background image of an imaging system according to a second embodiment.

FIG. 10 is a flowchart illustrating abnormality detection and removal processing to the background image of the imaging system according to this embodiment. Those elements or steps in this embodiment, which are corresponding elements or steps of the first embodiment, will be designated by the same reference numerals, and a duplicate description thereof will be omitted.

In step S1001, the image processing unit 705 generates a corrected image of the background image output in step S801 under the control of the CPU 702, and outputs the corrected image to the display apparatus 300. More specifically, for example, an image in which high-frequency components are reduced (high-frequency components are less than a second predetermined amount) by applying a low-pass filter to the background image output in step S801 is generated, and output to the display apparatus 300.

In step S1002, in a case when the resolution or imaging angle of the background image output in step S1001 differs from that of the image data captured in step S802, the CPU 702 performs resizing processing or angle correction processing for the background image to match the resolution and imaging angle. Then, the CPU 102 compares the image data of the portions corresponding to the background areas. In a case when the CPU 702 determines that a difference between pixels in the compared areas is equal to or greater than a predetermined value (a third predetermined value or greater), the CPU 702 executes the processing of step S810. In a case when the CPU 702 determines that the difference between pixels in the compared areas is less than a predetermined value (a third predetermined value or less), the CPU 702 executes the processing of step S1003. This embodiment determines whether the difference between pixels in the compared areas is equal to or greater than a predetermined value, but the present disclosure is not limited to this embodiment. For example, the processing of step S810 may be executed in a case when an average value of the differences between pixels is equal to or greater than a predetermined value, or in a case when the number of pixels whose difference between pixels is equal to or greater than a predetermined value is equal to or greater than a predetermined number of pixels.

In step S1003, the CPU 102 captures the background image and object output to the display apparatus 300 in step S1001, and records them in the recording medium I/F 110. The CPU 102 may output the captured image data via the image terminal unit 109 and record the data in the recording medium 712 of the image signal processing apparatus 700.

Performing the processing above can detect and remove abnormalities such as moiré that occur during imaging while a background image is displayed on a display unit.

Other Embodiments

Embodiment(s) of the disclosure can also be realized by a computer of a system or an apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g. an, application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), a digital versatile disc (DVD), or a Blu-ray Disc (BD)™), a flash memory device, a memory card, and the like.

Each embodiment can provide a processing apparatus that can detect abnormalities such as moiré that occur during imaging while a background image is displayed on a display unit.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

What is claimed is:

1. A processing apparatus configured to cause a display apparatus to display a first image, and to acquire from an image pickup apparatus a second image made by capturing at an angle of view including a display area of the display apparatus, the processing apparatus comprising:

a processor configured:

to acquire a distinction result of distinguishing between an area in which an object existing between the display area and the image pickup apparatus has been captured, and the display area in the second image;

to detect a change in the second image by comparing the first image with an image of the display area in the second image;

to perform first control for notifying information regarding a detection result;

to detect a first difference between the first image and the display area;

to detect a second difference between the display area in a third image acquired by correcting the second image so that the first difference is less than a first predetermined value, and a fourth image acquired by correcting at least one of a resolution and an imaging angle of the first image;

to perform second control to notify information regarding the second difference and to record the second image in a case when the second difference is equal to or greater than a second predetermined value; and to record the third image in a case when the second difference is less than a second predetermined value.

2. The processing apparatus according to claim 1, wherein the distinction result is acquired according to a distance from the image pickup apparatus to a target to be imaged.

3. The processing apparatus according to claim 1, wherein the processor is further configured to perform a comparison by detecting a difference between a fifth image acquired by correcting at least one of a resolution and an imaging angle of the first image, and the display area.

4. The processing apparatus according to claim 1, wherein the processor is further configured:

to detect a first difference between the first image and the display area; and to perform the first control in a case when the processing apparatus is not recording an image and the first difference is equal to or greater than a first predetermined value.

5. The processing apparatus according to claim 1, wherein the processor is further configured to record data indicating at least one of information regarding an area, a time, and a frame where correction has been performed in the second image.

6. The processing apparatus according to claim 1, wherein the processor is further configured:

to detect a first difference between the first image and the display area;

to detect a third difference between a fifth image acquired by correcting at least one of a resolution and an imaging angle of a sixth image acquired by correcting the first image so that the first difference is less than a second predetermined value, and the display area in the second image;

to perform a third control to notify information regarding the third difference and to record the second image in a case when the third difference is equal to or greater than a third predetermined value; and to record the second image without performing the third control in a case when the third difference is smaller than the third predetermined value.

7. The processing apparatus according to claim 6, wherein the processor is further configured to record data indicating at least one of information regarding an area, a time, and a frame where correction has been performed in the first image.

8. An imaging system comprising:

the processing apparatus according to claim 1;

a display apparatus configured to display the first image; and an image pickup apparatus configured to capture the second image including the display area of the display apparatus.

9. A processing apparatus configured to cause a display apparatus to display a first image, and to acquire from an image pickup apparatus a second image made by capturing at an angle of view including a display area of the display apparatus, the processing apparatus comprising:

a processor configured:

to detect whether or not moiré has occurred in the display area of the second image;

to record on a recording medium an image in which the moiré has been corrected and information regarding an area where the moiré has been detected in a case when the moiré has been detected;

to detect a first difference between the first image and the display area;

to detect a second difference between the display area in a third image acquired by correcting the second image so that the first difference is less than a first predetermined value, and a fourth image acquired by correcting at least one of a resolution and an imaging angle of the first image;

to perform second control to notify information regarding the second difference and to record the second image in a case when the second difference is equal to or greater than a second predetermined value; and to record the fourth image in a case when the second difference is less than a second predetermined value.

10. A processing method configured to cause a display apparatus to display a first image, and to acquire from an image pickup apparatus a second image made by capturing at an angle of view including a display area of the display apparatus, the processing method comprising the steps of:

acquiring a distinction result of distinguishing between an area in which an object existing between the display area and the image pickup apparatus has been captured, and the display area in the second image;

detecting a change in the second image by comparing the first image with an image of the display area in the second image;

performing first control for notifying information regarding a detection result;

detecting a first difference between the first image and the display area;

detecting a second difference between the display area in a third image acquired by correcting the second image so that the first difference is less than a first predetermined value, and a fourth image acquired by correcting at least one of a resolution and an imaging angle of the first image;

performing second control to notify information regarding the second difference and recording the second image in a case when the second difference is equal to or greater than a second predetermined value; and recording the fourth image in a case when the second difference is less than a second predetermined value.

11. A non-transitory computer-readable storage medium storing a program that causes a computer to execute the processing method recited in claim 10.

12. A processing apparatus configured to cause a display apparatus to display a first image, and to acquire from an image pickup apparatus a second image made by capturing at an angle of view including a display area of the display apparatus, the processing apparatus comprising:

a processor configured:

to acquire a distinction result of distinguishing between an area in which an object existing between the display area and the image pickup apparatus has been captured, and the display area in the second image;

to detect a change in the second image by comparing the first image with an image of the display area in the second image;

to perform first control for notifying information regarding a detection result;

to detect a first difference between the first image and the display area;

to detect a second difference between a third image acquired by correcting at least one of a resolution and an imaging angle of a fourth image acquired by correcting the first image so that the first difference is less than a second predetermined value, and the display area in the second image;

to perform a third control to notify information regarding the third difference and to record the second image in a case when the third difference is equal to or greater than a third predetermined value; and to record the second image without performing the third control in a case when the third difference is less than the third predetermined value.

13. A processing apparatus configured to cause a display apparatus to display a first image, and to acquire from an image pickup apparatus a second image made by capturing at an angle of view including a display area of the display apparatus, the processing apparatus comprising:

a processor configured:

to detect whether or not moiré has occurred in the display area of the second image;

to record on a recording medium an image in which the moiré has been corrected and information regarding an area where the moiré has been detected in a case when the moiré has been detected;

to detect a first difference between the first image and the display area;

to detect a second difference between a third image acquired by correcting at least one of a resolution and an imaging angle of a fourth image acquired by correcting the first image so that the first difference is less than a second predetermined value, and the display area in the second image;

to perform a third control to notify information regarding the third difference and to record the second image in a case when the third difference is equal to or greater than a third predetermined value; and to record the second image without performing the third control in a case when the third difference is less than the third predetermined value.

14. A processing method configured to cause a display apparatus to display a first image, and to acquire from an image pickup apparatus a second image made by capturing at an angle of view including a display area of the display apparatus, the processing method comprising the steps of:

acquiring a distinction result of distinguishing between an area in which an object existing between the display area and the image pickup apparatus has been captured, and the display area in the second image;

detecting a change in the second image by comparing the first image with an image of the display area in the second image;

performing first control for notifying information regarding a detection result;

detecting a first difference between the first image and the display area;

detecting a second difference between a third image acquired by correcting at least one of a resolution and an imaging angle of a fourth image acquired by correcting the first image so that the first difference is less than a second predetermined value, and the display area in the second image;

performing a third control to notify information regarding the third difference and to record the second image in a case when the third difference is equal to or greater than a third predetermined value; and recording the second image without performing the third control in a case when the third difference is less than the third predetermined value.

* * * * *